ial No. 244,469

2,769,811

PRODUCTION OF ALKENYL PYRIDINES

John E. Mahan, Bartlesville, Okla., assignor to Phillips Petroleum Company, a corporation of Delaware No Drawing. Application August 30, 1951,
Serial No. 244,469

9 Claims. (Cl. 260—290)

This invention relates to the production of alkenyl pyridines. In one of its specific aspects the invention pertains to the catalytic dehydrogenation of an alkyl pyridine having at least one alkyl group containing at least two carbon atoms. In a preferred embodiment, 2-methyl-5-ethylpyridine is dehydrogenated to form 2-methyl-5-vinylpyridine in the presence of several mols of steam per mol of 2-methyl-5-ethylpyridine and over an iron oxide catalyst containing chromia and potassium hydroxide in small amounts.

The catalytic dehydrogenation of alkyl pyridine presents various problems. These arise from the nature of the starting material and the products. The pyridine nucleus is known to poison the catalytic effect of various solid contact catalysts. Its decomposition at high temperatures results in nitrogen-containing materials which may adversely affect the catalyst and/or the course of the reaction. Deposition of carbonaceous material on catalyst surfaces tends to be aggravated by the very reactive nature of vinyl and other alkenyl pyridine compounds. Degradation and/or isomerization of alkyl and alkenyl groups tends to occur to a certain extent at high temperatures in the presence of dehydrogenation catalysts often decreasing the yield of the desired alkenyl pyridine.

An object of this invention is to produce alkenyl pyridines.

Another object is to effect dehydrogenation of an alkyl group containing at least two carbon atoms, e. g., ethyl, propyl, isopropyl, n-butyl, sec.-butyl, isobutyl, the various amyl, hexyl and higher groups, on a pyridine nucleus, to give as principal product a corresponding alkenyl pyridine.

A further object is to provide, for alkyl pyridine dehydrogenation, a catalyst comprising a major proportion by weight of iron oxide (more than 50 weight per cent calculated as $Fe_2O_3$) containing minor proportions by weight of a metal oxide selected from the group consisting of alumina, chromia, and thoria, and minor proportions by weight of an alkali metal oxide, hydroxide, or carbonate (calculated as the oxide).

Yet another object is to provide a self-catalyst regenerating catalytic dehydrogenation process for alkyl pyridines avoiding or minimizing shut-downs for purposes of catalyst regeneration.

A further object is to provide processes as described wherein the pyridine nucleus is substituted or fused with non-interfering groups.

Other objects, and advantages of the invention will be apparent to those skilled in the art, from the accompanying disclosure and discussion.

In a preferred embodiment of my invention, I have found that alkenyl pyridines can be prepared by the catalytic dehydrogenation of the corresponding alkyl pyridines at elevated temperatures in the presence of an inert diluent-heat carrier over a catalyst containing a major proportion by weight (more than 50 weight percent) of iron oxide promoted with from 0.5 to 15 weight percent (based on iron oxide calculated as $Fe_2O_3$) of at least one of alumina, chromia, and thoria and 0.5 to 60, preferably 0.5 to 15 weight percent (based on iron oxide calculated as $Fe_2O_3$) of at least one of the alkali metal (e. g., sodium, potassium, lithium) oxides, hydroxides, and carbonates (calculated as the oxides). A catalyst composed of iron oxide, chromia and potassium hydroxide is preferred. When operating according to the process of this invention, good yields of alkenyl pyridines are obtained with only relatively small quantities of by-products being formed.

The process of this invention is applicable to alkyl pyridines where at least one alkyl group is present which contains at least two carbon atoms. Di-, tri-, and tetraalkyl pyridines can be dehydrogenated with the alkyl substituents being present in various positions on the pyridine nucleus. Polyvinyl-pyridines as well as monovinyl-pyridines can be prepared according to this process. It is understood that the vinylpyridines produced can contain one or more vinyl groups and also one or more alkyl groups, particularly the methyl group. 2-methyl-5-vinylpyridine is one of the preferred compounds which is prepared by dehydrogenation of 2-methyl - 5 - ethylpyridine. Other examples are: 2-ethyl-4-ethylpyridine, 2-ethylpyridine, 2-ethyl-5-ethylpyridine, 3-ethylpyridine, 3-propylpyridine, 2-n-amylpyridine. Alkyl quinolines and other compounds having at least one alkyl group, containing at least two carbon atoms, attached to a pyridine nucleus and further having non-interfering groups attached to or fused with the pyridine nucleus, can also be dehydrogenated by the method of my invention. Examples are ethylquinolines, alkyl pyridines having a chlorine or nitro group substituted on a carbon atom of the pyridine nucleus, and the like.

Temperatures used for the reaction are preferably in the range from 1000 to 1300° F. Total pressures are generally in the range from 100 mm. of mercury to 25 p. s. i. g.

It is preferred that this process be operated in the presence of an inert diluent. While gases such as hydrogen, methane, nitrogen, $CO_2$ can be employed, I much prefer to use steam. Dilution ratios used range from 15 weights steam to 1 weight alkylpyridine charged down to about 2:1; usually 4:1 to 10:1 is optimum. When steam is employed, it provides a continuous means of regenerating the catalyst as carbon laid down is continuously converted to carbon dioxide. Thus a very long period of dehydrogenation is obtained without necessity for shut down to remove carbonaceous deposits with hot oxygen containing gases or steam in a separate operation.

Flow rates are advantageously in the range of 1 to 5 liquid volumes alkyl pyridine charged per volume of catalyst per hour, which corresponds to approximately 170 to 850 volumes gaseous alkyl pyridine (calculated at standard temperature and pressure) per volume catalyst per hour.

The catalysts employed in my invention can be prepared in various ways. For instance, hydrous oxides of iron and chromium can be coprecipitated by adding ammonium hydroxide to a solution of soluble iron and chromium salts, then washed, then mixed with the desired quantity of potassium hydroxide, then gently dried. After screening to desired size, say 4–20 mesh, it is heated at 1100° F. for several hours. Another method is to mix powdered iron oxide and chromium oxide with an aqueous solution of potassium salt, extrude and dry at elevated temperatures and time giving a surface area of below 30 square meters per gram. Many other procedures for preparing active catalysts will occur to those skilled in the art. The catalysts disclosed in Gutzeit 2,408,140, those disclosed in Eggertsen et al. 2,414,585, and those disclosed in Kearby 2,426,829, can be used in carrying out my process for dehydrogenating alkyl pyridines. During the dehydrogenation the potassium or other alkali metal compound is probably present both in the oxide, hydroxide and carbonate form; the percentages given herein as percent alkali metal oxide or alkali metal hydroxide are to be understood to apply to the total of the various forms which may be present. The iron oxide is believed to be largely converted to magnetic iron oxide ($Fe_3O_4$) under the dehydrogenation conditions.

The catalysts described herein are usually employed as such, without additional materials of the nature of carriers. However, carriers not affecting the catalyst, other than by extending the surface, can be used if desired, as well as carriers or other solids having catalytic and/or promoting effects.

Example I 2-methyl-5-ethylpyridine was dehydrogenated over a catalyst comprising approximately 93 weight percent iron oxide, 5 weight percent chromium oxide, and 2 weight percent potassium hydroxide to produce 2-methyl-5-vinylpyridine. A tubular reactor provided with a preheating section and a catalyst section was employed. Water was vaporized, the vapor heated to 400 to 600° F., and the 2-methyl-5-ethylpyridine injected into the stream to form a mixture of 2-methyl-5-ethylpyridine and steam. This mixture was then heated to the reaction temperature before it was passed over the catalyst. The following table shows operating data and yields of 2-methyl-5-vinylpyridine together with other products of the reaction.

| | |
|---|---|
| Catalyst volume, cc. | 350 |
| Catalyst weight, grams | 447 |
| Duration of run, hours | 5.0 |
| Volume feed rate, 2-methyl-5-ethylpyridine, cc./hr. (liquid) | 651 |
| Volume feed rate, water, cc./hr. (liquid) | 3003 |
| Weight feed rate, 2-methyl-5-ethylpyridine grams/hr | 603 |
| Weight feed rate, water, grams/hr | 3003 |
| Total weight 2-methyl-5-ethylpyridine fed, grams | 3017 |
| Total weight water fed, grams | 15,016 |
| Total weight combined feed, grams | 18,033 |
| Weight ratio of water to 2-methyl-5-ethylpyridine | 4.98 |
| Space velocity, v./v./hr.: | |
| 2-methyl-5-ethylpyridine (liquid) | 1.86 |
| Water (liquid) | 8.58 |
| Contact time, seconds | 0.0066 |
| Pressure | Atmospheric |
| Catalyst temperature, ° F., average: | |
| Top | 1133–1141 |
| Bottom | 1131–1138 |
| Dry off gas, cubic feet/hr. @ 32° F. and 760 mm. | 3.69 |
| Overall weight balance, percent recovery | 99.65 |
| Carbon balance, percent recovery | 96.91 |
| Hydrogen balance, percent recovery | 99.86 |
| Per pass yields, wt. percent: | |
| 2-methyl-5-vinylpyridine | 33.42 |
| 3-vinylpyridine | 1.07 |
| Per pass yields, mol percent: | |
| 2-methyl-5-vinylpyridine | 33.98 |
| 3-vinylpyridine | 1.23 |
| Ultimate yields, wt. percent: | |
| 2-methyl-5-vinylpyridine | 76.93 |
| Pyridine | 0.20 |
| 2-picoline | 1.18 |
| 3-picoline | 1.75 |
| 2,5-lutidine | 3.38 |
| 3-ethylpyridine | 1.37 |
| 3-vinylpyridine | 2.46 |
| Ultimate yields, mol percent: | |
| 2-methyl-5-vinylpyridine | 78.22 |
| Pyridine | 0.30 |
| 2-picoline | 1.54 |
| 3-picoline | 2.28 |
| 2,5-lutidine | 3.82 |
| 3-ethylpyridine | 1.54 |
| 3-vinylpyridine | 2.83 |
| Off gas analysis, percent, average: | |
| $CO_2$ | 12.0 |
| $CH_4$ | 2.0 |
| $C_2H_4$ | 0.3 |
| $C_2H_6$, $C_3H_6$, higher | 0.5 |
| $N_2$ | 4.3 |
| $H_2$ | 81 |

Example II 2-methyl-5-ethylpyridine was dehydrogenated over a catalyst comprising approximately 67 weight percent $Fe_2O_3$, 3 weight percent $Cr_2O_3$, and 30 weight percent KOH to produce 2-methyl-5-vinylpyridine. A tubular reactor provided with a preheating section and a catalyst section was employed. Water was vaporized, the vapor heated to 400 to 600° F., and the 2-methyl-5-ethylpyridine injected into the stream to form a mixture of the 2-methyl-5-ethylpyridine and steam. The mixture was then heated to the reaction temperature before it was passed over the catalyst. The following table shows operating data and yields of 2-methyl-5-vinylpyridine together with other products of the reaction.

| | |
|---|---|
| Catalyst volume, cc. | 150 |
| Catalyst weight, grams | 171 |
| Duration of run, hours | 2.417 |
| Volume feed rate, cc./hr. (liquid): | |
| 2-methyl-5-ethylpyridine | 183 |
| Water | 653 |
| Weight feed rate, grams/hr.: | |
| 2-methyl-5-ethylpyridine | 170 |
| Water | 653 |
| Total weight fed, grams: | |
| 2-methyl-5-ethylpyridine | 410 |
| Water | 1579 |
| Total weight combined feed, grams | 1989 |
| Weight ratio of water to 2-methyl-5-ethylpyridine | 3.85 |
| Space velocity, v./v./hr.: | |
| 2-methyl-5-ethylpyridine (liquid) | 1.22 |
| Water (liquid) | 4.35 |
| Contact time, seconds | 0.127 |
| Pressure | Atmospheric |
| Catalyst temperature, ° F., average: | |
| Top | 1139–1143 |
| Bottom | 1135–1146 |
| Per pass yields, wt. percent: | |
| 2-methyl-5-vinylpyridine | 31.44 |
| 3-vinylpyridine | 1.78 |
| Per pass yields, mol percent: | |
| 2-methyl-5-vinylpyridine | 31.96 |
| 3-vinylpyridine | 2.05 |
| Ultimate yields, wt. percent: | |
| 2-methyl-5-vinylpyridine | 70.09 |
| Pyridine | 0.0 |
| 2-picoline | 2.83 |
| 3-picoline | 1.14 |
| 2,5-lutidine | 3.75 |
| 3-ethylpyridine | 1.85 |
| 3-vinylpyridine | 3.97 |
| Ultimate yields, mol percent: | |
| 2-methyl-5-vinylpyridine | 71.25 |
| Pyridine | 0.0 |
| 2-picoline | 3.68 |
| 3-picoline | 1.48 |
| 2,5-lutidine | 4.24 |
| 3-ethylpyridine | 2.09 |
| 3-vinylpyridine | 4.57 |

Example III 2-methyl-5-ethylpyridine was dehydrogenated over a catalyst comprising approximately 93 weight percent iron oxide, 5 weight percent chromium oxide, and 2 weight percent potassium hydroxide to produce 2-methyl-5-vinylpyridine. A tubular reactor provided with a preheating section and a catalyst section was employed. 2-methyl-5-ethylpyridine was fed liquid phase to the preheating section. Simultaneously water, previously vaporized and the steam preheated to about 1350° F., was fed to the preheating section and this mixture was then passed to the catalyst section where dehydrogenation was accomplished at essentially atmospheric total pressure.

The reactor effluent contains, besides 2-methyl-5-vinylpyridine and unreacted 2-methyl-5-ethylpyridine, small quantities of lower boiling pyridines, such as 3-vinylpyridine and mono- and dimethylpyridines, as by-products of the process.

The following table shows operating data and yields of 2-methyl-5-vinylpyridine obtained in three runs carried out as described above.

|  | Runs | | |
| --- | --- | --- | --- |
|  | 1 | 2 | 3 |
| Catalyst volume, cc | 180 | 180 | 180 |
| Temperature, °F | 1,220-1,255 | 1,170-1,190 | 1,180-1,190 |
| Duration, hours | 6.35 | 6.0 | 6.0 |
| Charge, grams: | | | |
| 2-Methyl-5-ethylpyridine | 1,266 | 1,200 | 1,220 |
| Water (during actual run) | 4,315 | 4,086 | 4,100 |
| Space velocity, v./v./hr.: | | | |
| 2-Methyl-5-ethylpyridine, liquid | 1.21 | 1.22 | 1.24 |
| 2-Methyl-5-ethylpyridine, gas | 204 | 207 | 209 |
| Water, liquid | 3.78 | 3.79 | 3.79 |
| Water, gas | 4,700 | 4,700 | 4,700 |
| Water/2-methyl-5-ethylpyridine: | | | |
| Weight ratio | 3.41 | 3.41 | 3.35 |
| Mol ratio | 23.0 | 22.8 | 21.4 |
| Effluent: | | | |
| Organic layer, grams | 1,365 | 1,378 | 1,402 |
| Aqueous layer, grams | 3,994 | 3,871 | 3,816 |
| Analysis of organic layer— | | | |
| 2-Methyl-5-vinylpyridine, percent | 46.8 | 30.9 | 29.8 |
| Water, percent | 18.0 | 17.1 | 17.8 |
| By distillation, grams— | | | |
| Water | 252 | 239 | 258 |
| Total lower boiling pyridines | 87.5 | 34.6 | 40.9 |
| 2-Methyl-5-vinylpyridine | 622 | 416 | 411 |
| 2-Methyl-5-ethylpyridine recovered | 416 | 681 | 705 |
| 2-Methyl-5-ethylpyridine consumed | 850 | 519 | 515 |
| Yields, by distillation data, wt. percent per pass: | | | |
| Total lower boiling pyridines | 6.9 | 2.9 | 3.4 |
| 2-Methyl-5-vinylpyridine | 49.2 | 34.7 | 33.7 |
| Ultimate: | | | |
| Total lower boiling pyridines | 10.3 | 6.7 | 8.0 |
| 2-Methyl-5-vinylpyridine | 73.5 | 80.4 | 79.9 |

I claim:

1. A dehydrogenation process which comprises passing an alkyl pyridine selected from the group consisting of 2-methyl-5-ethylpyridine, 2-ethyl-4-ethylpyridine, 2-ethylpyridine, 2-ethyl-5-ethylpyridine, 3-ethylpyridine, 3-propylpyridine, and 2-n-amylpyridine over a catalyst comprising a major proportion by weight of iron oxide, a minor proportion by weight of chromium oxide, and a minor proportion by weight of a compound selected from the group consisting of alkali metal oxides, hydroxides, and carbonates at a temperature in the range from 1000° to 1300° F. to thereby produce an alkenyl pyridine corresponding to said alkyl pyridine.

2. A dehydrogenation process which comprises passing an alkyl pyridine over a catalyst comprising iron oxide promoted with from 0.5 to 15 percent of chromium oxide, and from 0.5 to 60 percent (calculated as the oxide) of a compound selected from the group consisting of alkali metal oxides, hydroxides, and carbonates, said percentages being percentages by weight based on the iron oxide calculated as $Fe_2O_3$ at a temperature in the range from 1000° to 1300° F. to thereby produce an alkenyl pyridine corresponding to said alkyl pyridine.

3. A dehydrogenation process which comprises subjecting a mixture of an alkyl pyridine selected from the group consisting of 2-methyl-5-ethylpyridine, 2-ethyl-4-ethylpyridine, 2-ethylpyridine, 2-ethyl-5-ethylpyridine, 3-ethylpyridine, 3-propylpyridine, and 2-n-amylpyridine and steam to contact with a catalyst containing a major proportion by weight of iron oxide and minor proportions by weight of chromia and potassia at a temperature within the range of 1000 to 1300° F. for a time to effect dehydrogenation of said alkyl pyridine to a corresponding alkenyl pyridine.

4. A process which comprises passing a mixture of 2-methyl-5-ethylpyridine and from 2 to 15 weights steam per weight of said 2-methyl-5-ethylpyridine, over a catalyst comprising iron oxide from 0.5 to 15 percent chromia and from 0.5 to 15 percent potassia (present as at least one of potassium oxide, hydroxide, and carbonate), said percentages being percentages by weight based on the iron oxide calculated as $Fe_2O_3$, at a temperature within the range of 1000 to 1300° F., a total pressure not in excess of 25 p. s. i. g., and a space velocity of 1 to 5 liquid volumes 2-methyl-5-ethylpyridine charged per volume catalyst per hour, and recovering 2-methyl-5-vinylpyridine so produced.

5. A process according to claim 1, wherein said alkyl pyridine is an ethyl pyridine.

6. A process according to claim 1, wherein said alkyl pyridine is 2-methyl-5-ethylpyridine.

7. A process according to claim 1, wherein said alkyl pyridine is 2-ethylpyridine.

8. A process which comprises subjecting a mixture of one weight of an ethyl pyridine plus from 2 to 15 weights steam to contact, at a temperature of 1000 to 1300° F., with a catalyst comprising iron oxide promoted with from 0.5 to 15 percent of chromium oxide, and from 0.5 to 60 percent (calculated as the oxide) of a compound selected from the group consisting of alkali metal oxides, hydroxides, and carbonates, said percentages being percentages by weight based on the iron oxide calculated as $Fe_2O_3$, and recovering vinylpyridine so produced.

9. A process which comprises subjecting a mixture of one weight of an ethyl pyridine plus from 2 to 15 weights steam to contact, at a temperature of 1000 to 1300° F., with a catalyst comprising iron oxide plus from 0.5 to 15 percent chromia and from 0.5 to 60 percent potassia (present as at least one of potassium oxide, hydroxide, and carbonate), said percentages being percentages by weight based on the iron oxide calculated as $Fe_2O_3$, and recovering vinylpyridine so produced.

References Cited in the file of this patent

UNITED STATES PATENTS

| 2,182,431 | Groll et al. | Dec. 5, 1939 |
| 2,184,235 | Groll et al. | Dec. 19, 1939 |
| 2,300,971 | Roberts et al. | Nov. 3, 1942 |

FOREIGN PATENTS

| 387,507 | Great Britain | 1933 |

OTHER REFERENCES

French et al., "Ind. and Eng. Chem" (1948) vol. 40, pp. 880–2.

Fieser et al., "Org. Chem.' (1944) p. 32.